Figure 4:
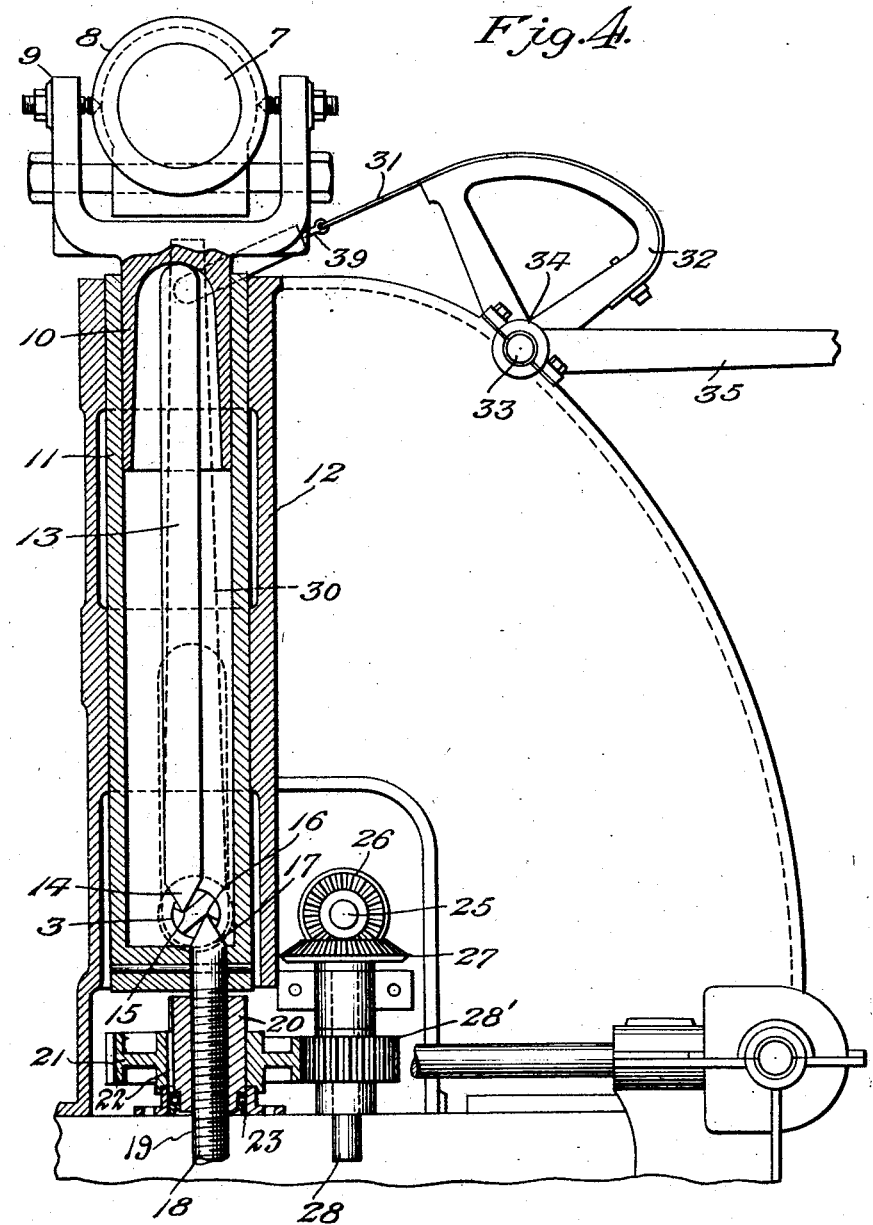

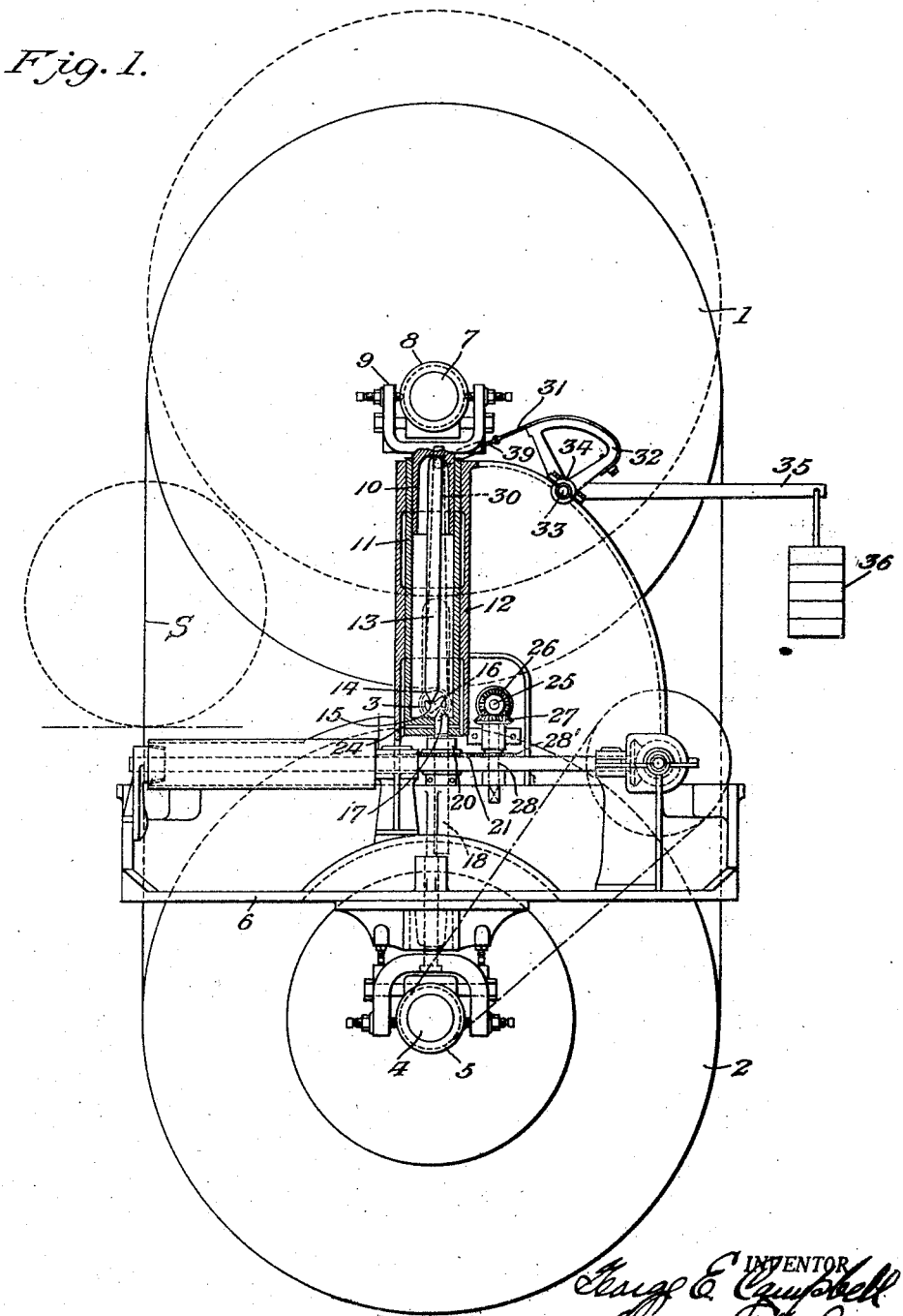

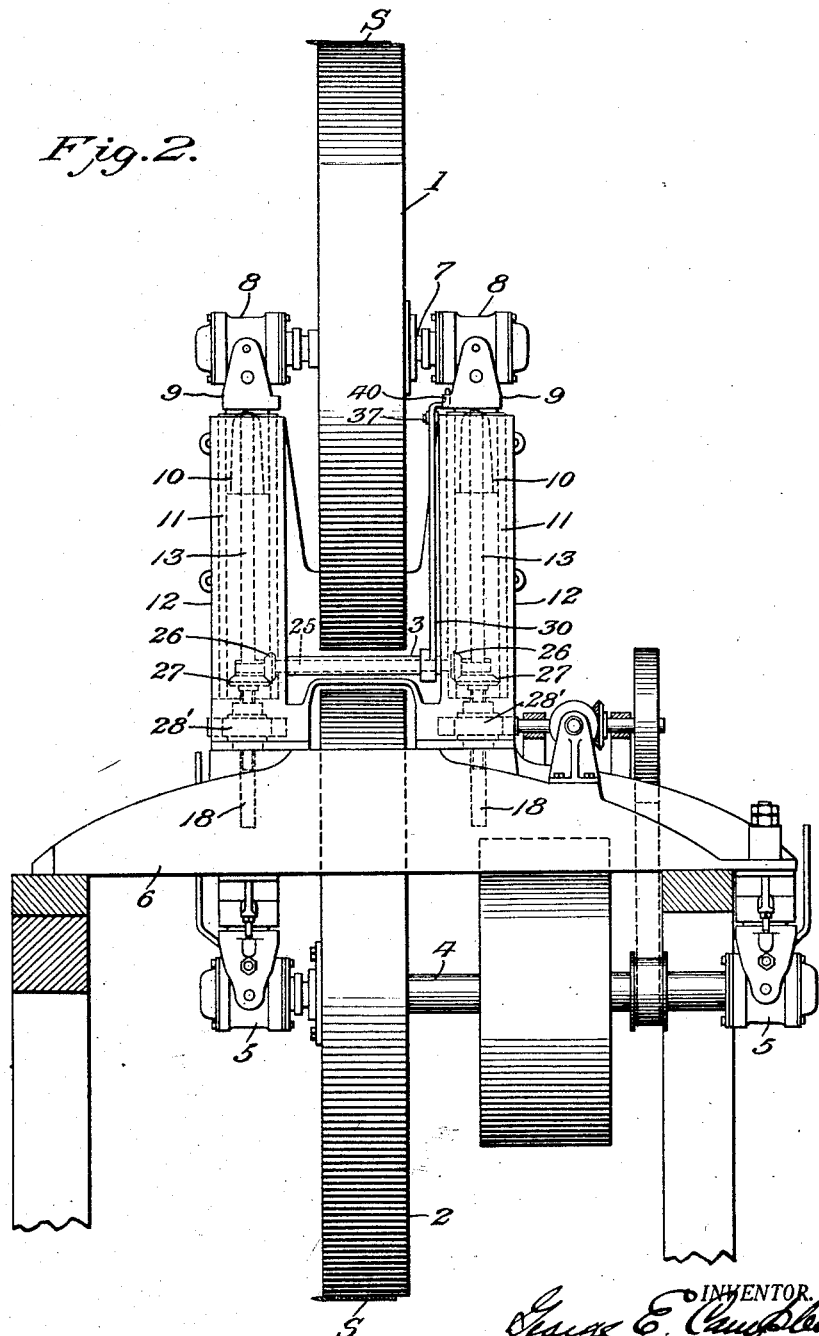

Dec. 29, 1925.
G. E. CAMPBELL
1,567,911
TENSION FOR BAND MILLS
Filed March 31, 1922      4 Sheets-Sheet 3
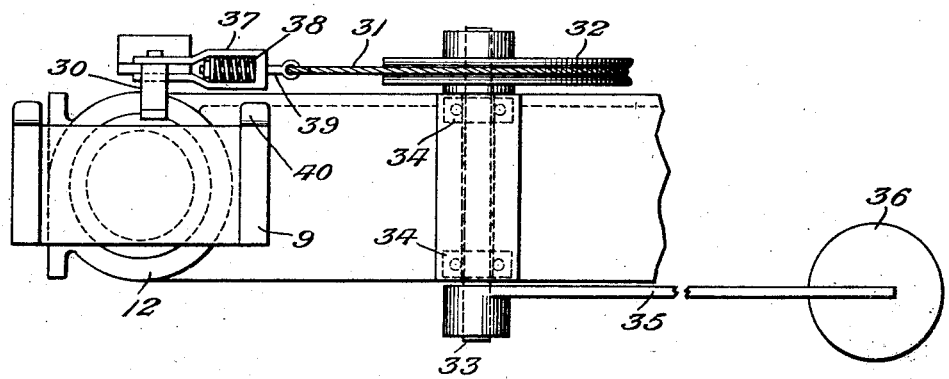
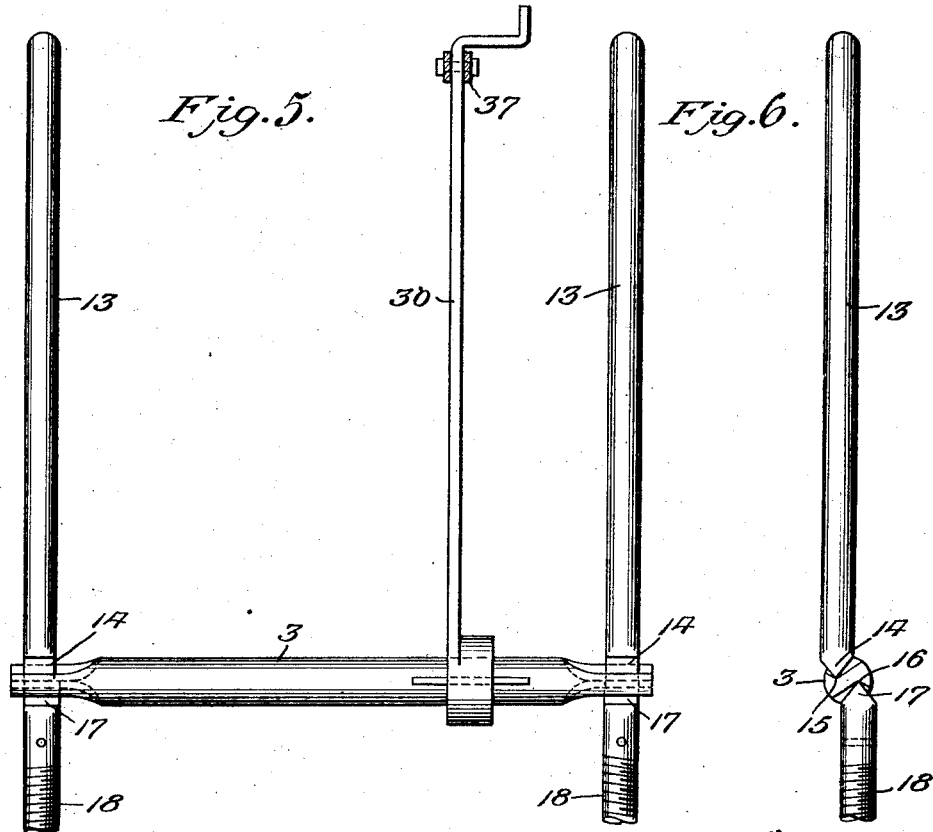

Dec. 29, 1925.

G. E. CAMPBELL 1,567,911

TENSION FOR BAND MILLS

Filed March 31, 1922  4 Sheets-Sheet 4

Patented Dec. 29, 1925.

1,567,911

UNITED STATES PATENT OFFICE.

GEORGE E. CAMPBELL, OF CHATTANOOGA, TENNESSEE, ASSIGNOR TO THE WHELAND COMPANY, OF CHATTANOOGA, TENNESSEE, A CORPORATION OF TENNESSEE.

TENSION FOR BAND MILLS.

Application filed March 31, 1922. Serial No. 548,352.

*To all whom it may concern:*

Be it known that I, GEORGE E. CAMPBELL, a citizen of the United States, residing at Chattanooga, in the county of Hamilton and State of Tennessee, have invented certain new and useful Improvements in Tensions for Band Mills, of which the following is a specification.

This invention relates to an improvement in tensions for band mills.

Three things happen to a saw-mill which make a sensitive balance under the top wheel necessary.

First:—Sawdust and other obstructions may get between the saw and the lower wheel; however, this stuff does not accumulate there, as a scraper is provided on all wheels to remove same.

Second:—A saw sometimes becomes warm while cutting. This causes the saw to expand and elongate.

Third:—When the saw first enters the log it slightly stretches, due to the sudden work applied to the saw, and as the log passes from the saw and work is finished, the saw goes back to its original length.

All of these conditions make it necessary to have a sensitive balance under the top wheel, as an even tension on the saw under all conditions is desirable.

In consequence it has long been an object with the sawmill manufacturers to obtain as sensitive a balance as possible under the upper wheel; and it has therefore been the custom heretofore, so far as I am aware, for most manufacturers simply to key on an arm to the cross-shaft, and permit this arm to extend out in a horizontal position with respect to the bed of the mill; and on the end of this arm it has been customary to hang weights.

In order that this arm be sufficiently strong to do its work, it has been necessarily very heavy, and the very weight of the arm itself has been an obstacle to keeping a sensitive tension on the saw.

With the present design, this arm extends vertically instead of horizontally, thus doing away with the weight of the arm itself, so far as it affects the tension upon the saw.

Another advantage of the present invention over the old is in changing saws. With the old arrangement, it was necessary for the operator when changing saws not only to raise and lower the upper wheel, but also the tension weights as well, whereas, under the present arrangement, all of this is obviated.

In the accompanying drawings:—

Fig. 1 is a view in side elevation;
Fig. 2 is a front view;
Fig. 3 is a detail plan view;
Fig. 4 is a horizontal section;
Figs. 5 and 6 are details.

The numerals 1 and 2 represent the upper and lower wheels, and S, the band-saw.

The lower wheel 2 is keyed or otherwise secured to an axle 4, the ends of which are supported in journals 5 held below the base 6 in the usual manner. The upper wheel 1 is mounted on the axle 7, the ends of which are journaled in boxes 8, which latter are supported in the upper ends of the yokes 9. These yokes have depending hollow shanks 10, each of which is slidably mounted in the upper end of a tubular sleeve 11, which latter is vertically adjustable in the tubular column 12, forming a part of the main frame of the saw-mill.

Within the hollow shanks 10, and tubular sleeves 11, steel rods 13 are housed, the upper end of each of these rods being rounded and supporting a yoke 9, as shown in Fig. 1, while the lower end is tapered to a knife edge 14, and rests in an off-center notch 15 in the upper surface of cross-shaft 3.

Another off-center notch 16 on the under side of this shaft receives knife-edge 17 formed on the upper end of the pin 18. This pin 18 has threads 19, and a nut 20 having threads fitted thereto has a gear 21 keyed to it, as at 22, and is preferably supported on ball-bearings 23, as clearly shown in Fig. 4.

The lower end of the tubular sleeve 11 is secured to the upper end of the pin 18 by a pin 24, so that by turning the gear or pinion 21 it turns the nut 20, and through it raises or lowers the screw 18 with the hollow sleeve 11.

Motion is transmitted across from one side of the wheels 1 and 2 to the other by shaft 25, as shown in Fig. 2, upon the ends of which are the bevel-gears 26 meshing into bevel-gears 27 on vertical shafts 28, upon which shafts are keyed pinions 28', which mesh with gear-pinions 21, so that when the pin 18 with the tubular sleeve 11 is raised or lowered on one side, the corresponding parts are correspondingly raised or lowered on the other side of the mill.

The shaft 25 is adapted to be turned by a hand-wheel (not shown).

Returning now to the saw tension, which besides including the parts 3, 10, 11, 13, 14, 15, 16, 17 and 18, also includes the vertically-disposed arm 30, keyed to the cross-shaft 3, as shown in dotted lines in Figs. 1 and 4, and in full lines in Figs. 2, 3 and 5. The upper end of this arm 30 is connected by cable 31 to the quadrant 32 secured on the shaft 33, which is capable of rocking in bearings 34, as shown in Figs. 1 and 3. A tension lever 35 extends out from this shaft 33, from which are hung weights 36.

The cable is connected to the upper end of the arm 30 by a forked yoke 37, containing a coiled spring 38, through which is passed an eye-bolt 39, which connects directly to the cable 31.

It will readily be seen that the more weight placed on the end of tension-lever 35, the greater will be the tendency to lift the upper wheel, and thereby to put strain upon the saw S, which runs around the face of the upper and lower wheel.

In changing a saw with this arrangement, the arm 30 is swung over against the stub 40, after which the wheel can be raised or lowered through the screw 18, the nut 20, and the gear-pinion 21, as hitherto explained, without any attention to the weights 36 at all.

Claims:

1. The combination with a band saw wheel, of a bearing support therefor, a column extending toward said bearing, a rock-shaft for adjustably supporting the bearing, a substantially vertically disposed arm, secured to the rock-shaft and extending substantially parallel to said column to a point adjacent said bearing, and means connected with the outer end of the arm for applying tension thereto to rock said arm and the rock-shaft.

2. The combination with a band saw wheel, of a movable bearing support therefor, a column extending upwardly toward said bearing on one side of said wheel, a rock-shaft for adjustably supporting the bearing, a substantially vertically disposed arm secured to the rock-shaft and extending upward between the column and the wheel to a point adjacent said bearing, a substantially horizontally disposed lever, and means extending laterally from the outer end of the vertically disposed arm and connected with the lever for applying tension to the arm and rock-shaft.

3. In tensions for band saws, the combination of a movably supported band saw bearing, a rock-shaft for adjustably supporting the bearing, a substantially vertically disposed arm secured on the rock-shaft, a quadrant, a cable and spring forming a connection between the vertically disposed arm and the quadrant, and a substantially horizontally disposed lever normally under tension and connected with the quadrant for applying tension through the quadrant and cable to the vertically disposed arm and rock-shaft.

4. A tension for band-mills including a movable wheel support, a rod poised to sustain the weight of said support, a vertically-disposed arm for raising and lowering the rod and the support resting thereon, and tension means connected with said arm, said tension means comprising a tension-lever and a cable connecting said lever with the vertically-disposed arm, through the medium of a coil-spring and eye-bolt.

5. The combination of a band saw wheel, a support therefor, a hollow column, a tubular sleeve within the column, a rock-shaft carried by the tubular sleeve and having off-center notches, a rod resting in one of the notches and supporting the wheel support, and means for applying tension to the rock-shaft.

6. The combination of a band saw wheel, movable yokes for supporting said wheel, hollow columns, tubular sleeves within the columns, a rock-shaft carried by the tubular sleeves and having off-center notches, rods carried within the sleeves having knife edges at their lower ends resting in the uppermost notches, and their upper ends extending beneath and supporting the yokes, and means for applying tension to the rock-shaft.

7. A tension for band-mills including a rock-shaft having off-center notches, a rod resting in one of the notches, a movable yoke mounted upon the rod, a band saw wheel supported on the yoke, and means for raising the rock-shaft comprising a pin having screw-threads thereon, a nut screwed onto the threads of the pin, and means for turning the nut on the pin.

8. A tension for band-mills including a rock-shaft having off-center notches, a rod resting in one of the notches, a movable yoke mounted upon the rod, a band saw wheel supported on the yoke, means for applying tension to the rock-shaft, and means for raising and lowering the rock-shaft comprising a pin engaging one of the notches in the rock-shaft and having screw threads thereon, a nut screwed onto the threads of the pin, and gears connected with the nut for turning the same for raising or lowering the pin.

9. A tension for band mills including a rock-shaft having off-center notches, rods resting in the uppermost notches, movable yokes mounted upon the rods, a band saw wheel supported on the yokes, pins extending into the lowermost notches, said pins having screw-threaded nuts thereon, gear pinions keyed to the nuts, a cross-shaft having bevel pinions on either end, vertical shafts having bevel pinions meshing therewith, gears meshing with the gear pinions, and means for turning the cross-shaft for raising or lowering the yokes and their connected parts.

10. The combination with an upper and lower wheel, band-saws carried thereby, movable yokes in which the bearings of the upper wheel are held, hollow columns, tubular sleeves within said columns, a cross-shaft carried by and capable of being rocked in said tubular sleeves, said cross-shaft having off-center notches on opposite sides at each end, rods carried within the sleeves having knife edges at their lower ends resting in the upper notches, and their upper ends extending beneath and supporting the yokes, pins having knife edges extending up from the lower ends of the hollow sleeves into the off-center notches on the lower surface of the cross-shaft, said pins having screw-threads, nuts thereon, and gear pinions keyed to the nuts, a cross-shaft having bevel pinions on either end, and vertical shafts having bevel pinions meshing therewith, and gears meshing with the gear pinions, means for turning said shaft whereby to raise or lower the tubular sleeves with their connected parts bodily, and means for applying tension to the cross shaft.

11. A tension for band-mills including a rock-shaft having off-center notches on its opposite surfaces, a pin having a knife edge which enters one of said notches, a rod having a knife edge resting in the other notch, means for raising and lowering the rock-shaft and the parts co-operating therewith, a movable yoke resting upon the upper end of said rod, a band saw wheel supported by said yoke, and a tension device including a vertically disposed arm secured to the rock-shaft, a tension lever having tension means supported upon one end thereof, a coil-spring and eye-bolt connected to the vertically disposed arm, and a cable extending from the coil spring and eye-bolt to the tension lever.

In testimony whereof I affix my signature.

GEORGE E. CAMPBELL.